(12) United States Patent
Light-Holets et al.

(10) Patent No.: US 11,797,898 B2
(45) Date of Patent: Oct. 24, 2023

(54) METHOD AND APPARATUS FOR PLATOONING OF VEHICLES

(71) Applicant: Cummins Inc., Columbus, IN (US)

(72) Inventors: Jennifer Kay Light-Holets, Greenwood, IN (US); Daniel E. Kershner, Seymour, IN (US); Morgan M. Andreae, Columbus, IN (US); Jeffrey A. Matthews, Plymouth, MN (US); Kristopher Ray Young, Queen Creek, AZ (US)

(73) Assignee: Cummins Inc., Columbus, IN (US)

( * ) Notice: Subject to any disclaimer, the term of this patent is extended or adjusted under 35 U.S.C. 154(b) by 86 days.

(21) Appl. No.: 17/385,317

(22) Filed: Jul. 26, 2021

(65) Prior Publication Data
US 2021/0350300 A1   Nov. 11, 2021

Related U.S. Application Data

(63) Continuation of application No. 15/649,877, filed on Jul. 14, 2017, now Pat. No. 11,107,018.

(60) Provisional application No. 62/362,839, filed on Jul. 15, 2016.

(51) Int. Cl.
| | | |
|---|---|---|
| *G06Q 10/00* | (2023.01) | |
| *G06Q 20/00* | (2012.01) | |
| *G06Q 10/0631* | (2023.01) | |
| *G06Q 10/08* | (2023.01) | |
| *G06Q 20/40* | (2012.01) | |
| *G06Q 10/06* | (2023.01) | |

(52) U.S. Cl.
CPC ....... *G06Q 10/06311* (2013.01); *G06Q 10/06* (2013.01); *G06Q 10/06316* (2013.01); *G06Q 10/08* (2013.01); *G06Q 20/405* (2013.01)

(58) Field of Classification Search
CPC ........................................ G06Q 10/00–50/00
USPC ......................................................... 705/7.36
See application file for complete search history.

(56) References Cited

U.S. PATENT DOCUMENTS

| | | | |
|---|---|---|---|
| 5,680,122 A | 10/1997 | Mio | |
| 8,352,111 B2 | 1/2013 | Mudalige | |
| 8,649,962 B2* | 2/2014 | Davis | G01C 21/3484 |
| | | | 701/400 |
| 9,037,389 B2 | 5/2015 | You | |
| 9,227,639 B1 | 1/2016 | Bryant et al. | |
| 9,423,794 B2 | 8/2016 | Lind et al. | |
| 2010/0256836 A1 | 10/2010 | Mudalige | |

(Continued)

OTHER PUBLICATIONS

Debruhl, Bruce, Is Your Commute Driving You Crazy?, A Study of Misbehavior in Vehicular Platoons, 2015.

*Primary Examiner* — Mustafa Iqbal
(74) *Attorney, Agent, or Firm* — Taft Stettinius & Hollister LLP

(57) ABSTRACT

Platooning vehicles can result in operational cost savings. Disclosed is a method of apportioning costs that are incurred/saved as a result of platooning vehicles, as well as assigning penalties for unfair platoon participation. For example, platooning history of a vehicle can be tracked, and if that vehicle acts too often as a trailing vehicle in a series of platoons then a penalty might be assigned to that vehicle. Also disclosed is a technique for operating a platoon in the presence of external factors such as municipal regulations, merging traffic, emergency vehicles, etc.

18 Claims, 2 Drawing Sheets

(56) References Cited

U.S. PATENT DOCUMENTS

| | | |
|---|---|---|
| 2013/0338855 A1* | 12/2013 | Mason .................. G07C 5/008 |
| | | 701/2 |
| 2014/0316671 A1 | 10/2014 | Okamoto |
| 2014/0316865 A1* | 10/2014 | Okamoto ............. G05D 1/0293 |
| | | 705/14.1 |
| 2015/0154871 A1* | 6/2015 | Rothoff ................... G08G 1/22 |
| | | 701/2 |
| 2015/0262481 A1 | 9/2015 | Selin |
| 2016/0019782 A1 | 1/2016 | Alam et al. |
| 2016/0026187 A1 | 1/2016 | Alam et al. |
| 2016/0054735 A1 | 2/2016 | Switkes et al. |
| 2016/0203435 A1* | 7/2016 | Waltniel ......... G06Q 10/063118 |
| | | 705/7.17 |
| 2017/0011633 A1 | 1/2017 | Boegel |
| 2017/0349176 A1 | 12/2017 | Alden et al. |
| 2020/0193733 A1* | 6/2020 | Marjanovic .............. G08G 1/22 |

* cited by examiner

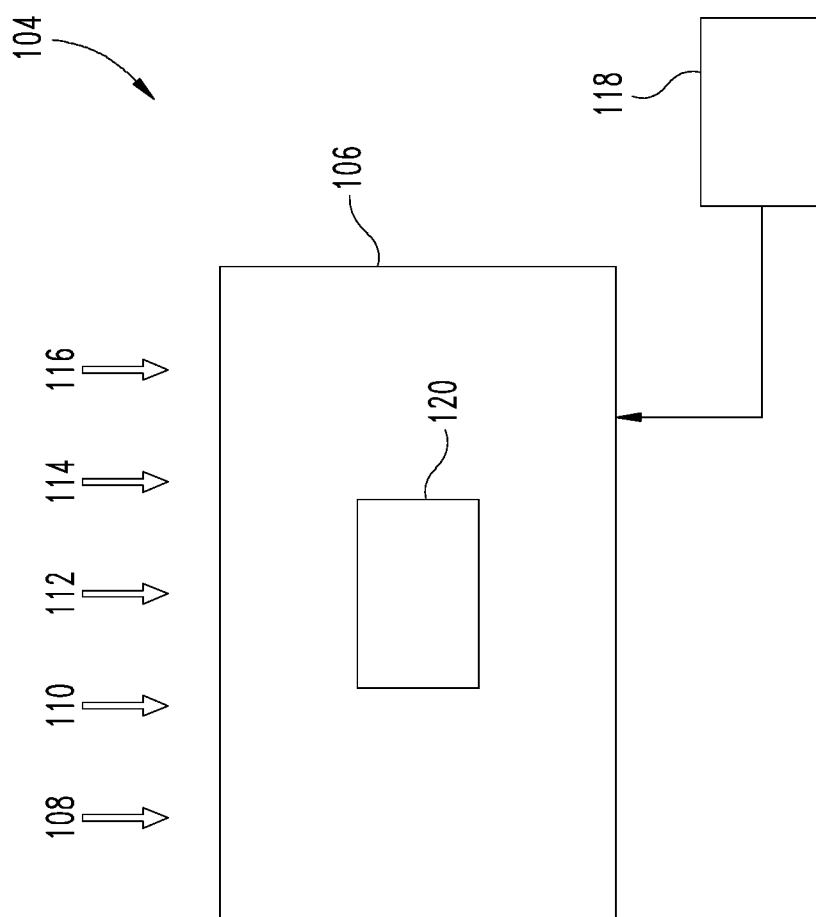

METHOD AND APPARATUS FOR PLATOONING OF VEHICLES

CROSS-REFERENCE TO RELATED APPLICATIONS

The present application is a continuation of U.S. patent application Ser. No. 15/649,877 filed on Jul. 14, 2017, which claims the benefit of the filing date of U.S. Provisional Application No. 62/362,839, filed Jul. 15, 2016, each of which are incorporated herein by reference in their entirety for all purposes.

TECHNICAL FIELD

The present invention generally relates to platooning of vehicles, and more particularly, but not exclusively, to platooning vehicles to account for cost and/or operational considerations.

BACKGROUND

Operating vehicles in a platoon arrangement remains an area of interest. Some existing systems have various shortcomings relative to certain applications. Accordingly, there remains a need for further contributions in this area of technology.

SUMMARY

One embodiment of the present invention is a unique method for platooning of vehicles. Other embodiments include apparatuses, systems, devices, hardware, methods, and combinations for platooning vehicles. Further embodiments, forms, features, aspects, benefits, and advantages of the present application shall become apparent from the description and figures provided herewith.

BRIEF DESCRIPTION OF THE FIGURES

FIG. 2 depicts an embodiment of an apparatus useful to operate a platoon of vehicles.

DETAILED DESCRIPTION OF THE ILLUSTRATIVE EMBODIMENTS

Figure 1:
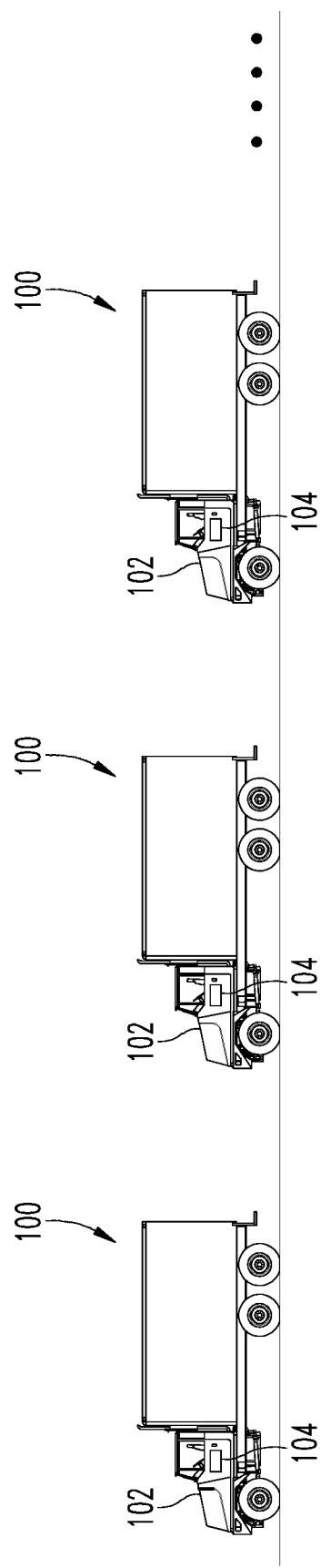
FIG. 1 depicts an embodiment of platooning vehicles.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic view of an example vehicle system 100 including an engine 102, such as an internal combustion engine, structured to generate power for the vehicle system 100. The vehicle system 100 can sometimes be referred to herein as a truck, or tractor-trailer semi, etc for ease of convenience, but no limitation is hereby intended to limit the system 100 to a truck, or tractor-trailer semi, etc. Thus, the term vehicles system 100, truck, tractor-trailer semi, or other vehicle designation is intended to cover a wide range of vehicles such as trucks, tractor-trailers, box trucks, busses, passenger cars, etc. The vehicle systems 100 illustrated in FIG. 1 are depicted as tractor trailers, but any type of vehicle is thus contemplated herein. Several vehicle systems 100 are illustrated in a platooning operation in which the vehicles act together to reduce overall fuel costs and improve operation. Although only three vehicle systems 100 are illustrated, any number of vehicles can be used.

Platooning vehicles can be described as a state where a series of tractor-trailer semis are linked together by telematics or GPS where the units or engines communicate to transverse in a line as an operational cost efficient strategy. The lead vehicle may be equipped with aerodynamic capability (wind assist panels on cab & trailer, aerodynamic tractor body) that creates a laminar flow of air (tunnel effect) that greatly reduces air drag. The following semis are spaced close enough to the lead vehicle taking advantage of the "tunnel" increasing fuel economy.

The vehicle system 100 can include a controller 104 used to regulate various aspects of the platooning arrangement depicted in FIG. 1 and discussed herein. The controller can be a single device or alternatively composed of a number of separate devices acting in concert. The controller 104 can be comprised of digital circuitry, analog circuitry, or a hybrid combination of both of these types. Also, the controller 104 can be programmable, an integrated state machine, or a hybrid combination thereof. The controller 104 can include one or more Arithmetic Logic Units (ALUs), Central Processing Units (CPUs), memories, limiters, conditioners, filters, format converters, or the like which are not shown to preserve clarity. In one form, the controller 104 is of a programmable variety that executes algorithms and processes data in accordance with operating logic that is defined by programming instructions (such as software or firmware). Alternatively or additionally, operating logic for the controller 104 can be at least partially defined by hardwired logic or other hardware.

Turning now to FIG. 2, there is illustrated an exemplary electronic control system 104 useful to control various aspects of one or more of the vehicle systems 100 as well as the platooning techniques described herein. In one form the electronic control system 104 is included in each individual vehicle system 100, but in some forms the electronic control system 104 will be understood to be the collective control functionality as the systems 100 cooperate to platoon using the techniques described below.

The electronic control system 104 can include one or more of the following (depending on the capabilities of any given vehicle system 100): an engine control module (ECM) 106, vehicle operator input (VOI) system 108, human-machine interface (HMI) system 110, GPS system 112, vehicle-to-X communication (V2X) system 114, vehicle proximity sensor (VPS) system 116, and a calibration interface 118 which supports communication with an electronic system calibration tool. It shall be appreciated that system 108 is an example of a system structured to provide operator input via one or more vehicle controls that is used to control the vehicle. It shall be further appreciated that systems 110, 112, 114, 116, and 118 are examples of systems that are structured to receive information from a source external to a vehicle system which relates to vehicle environment factors, location factors, mission factors, warranty factors (e.g., component residual life, component replacement cost and component replacement time), operator-specified factors, and/or fleet-specified factors. System 300 may also include a number of additional or alternate systems and/or additional or alternate inputs.

VOI system 108 provides information pertaining to vehicle operator control commands to ECM 106. The provided information may include brake pedal position information, accelerator pedal position information, cruise control setting information, and other information provided by a vehicle operator via one or more vehicle control devices or systems. ECM 106 may process the received information to determine additional information including, for example, brake pedal position rate of change information, brake pedal actuation frequency information, accelerator pedal position rate of change information, and accelerator pedal actuation frequency information. In certain embodiments such additional information by be determined by VOI system 108 prior to being provided to ECM 106.

ECM 106 may utilizes the information received from system 302 in determining commands for controlling various operational aspects of vehicle system 100, for example, engine control commands, fueling control commands, transmission shift commands, and brake actuation commands, among others.

HMI system 110 includes a human-machine interface through which a vehicle operator or another person may provide additional information from a source external to the vehicle system. The human-machine interface may comprise a touch screen display, keypad or other device through which information may be input. The human-machine interface may also comprise a wireless communication system allowing a person remote from the vehicle to input information. The provided information may include information relating to the existence and/or duration of extended idle conditions, mission performance parameters (e.g., mission route, mission length, length or duration of certain mission activities, platooning or convoying opportunities, route planning, and weather or traffic planning), requirements for shore power (e.g., auxiliary power unit (APU) devices such as no-idle climate control systems or other power take off (PTO) devices), among other information. The provided information may include information related to warranty factors including, for example, residual life of one or more components, replacement cost for one or more components, and replacement time for one or more components. The provided information may include information related to operator-specified factors including, for example, fuel cost, diesel exhaust fluid (DEF) cost, fuel and/or DEF availability, fuel and/or DEF supply or purchase agreements, sociability constraints, peak performance requests, and on/off-road use, among others. The provided information may include information related to fleet-specified factors including, for example, emissions banking and credit trading, load management, and customer or fleet operator preferences.

GPS system 112 provides information pertaining to vehicle location to ECM 106. The vehicle location information may be received by a receiver of system 306 as a wireless signal from a satellite-based global positioning system. The received information may be provided to ECM 106 in the form received or may be pre-processed to decode or change the format or organization of the received information.

V2X system 114 provides information received from one or more external sources to ECM 106. The information may be received by a receiver or transceiver of system 114 as a wireless communication signal from a variety of different sources equipped with a wireless transmitter or transceiver including, for example, other vehicles, traffic lights and other traffic signals, utility grid devices or systems, stationary transceivers in communication with other communication networks and remote servers or human-staffed computing systems also in communication with the other communication networks. The provided information may include information related to road or traffic signal conditions, information related to weather conditions, information related to warranty factors including, for example, component residual life, component replacement cost and component replacement time, information related to operator-specified factors including, for example, fuel cost, DEF cost, fuel availability, fuel agreements, sociability constraints, peak performance requests, on/off-road use, information related to fleet-specified factors including, for example, emissions banking and credit trading, load management, and customer or fleet operator preferences.

V2X system 114 may be utilized in connection with intelligent transport systems (ITS) which comprise systems that integrate of information and communication technologies with transport infrastructure to improve economic performance, safety, mobility and environmental sustainability. An exemplary ITS system includes three operational layers: a data collection layer, a data aggregation and translation layer and an information dissemination layer. The data collection layer may include one or more elements of electronic control system 104 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include one or more elements of electronic control system 104 as well as devices and systems on a plurality of vehicles which receive information transmitted from the data aggregation and translation layer. The received information may include road grade information, information about traffic speed over a given segment of roadway, as well as information about weather conditions such as wind speed, precipitation and road conditions may be derived. ITS information from one or more of the foregoing layers may be received by system 114 and provided to ECM 106.

Proximity sensor system 116 provides information pertaining to other vehicles or objects within a sensor range to the vehicle to ECM 106. The provided information may include distance to one or more vehicles 100 or objects in sensor range, velocity of one or more vehicles 100 or objects in sensor range and acceleration of one or more vehicles 100 or objects in sensor range. ECM 106 can include an engine controller 120. ECM 106 may also include additional or alternate controllers including, for example, transmission controllers, aftertreatment system controllers and vehicle system controllers, among others. ECM 106 is structured to provide one or more inputs received from systems 108, 110, 112, 114, 116, and 118 to the controller 120.

Engine controller 120 may be structured to control a number of aspects of the operation of the engine 102 and other associated elements of vehicle system 100 including, for example, air handling, provision of a first fuel type and exhaust aftertreatment, among others.

One or more of the aforementioned systems (ECM, VOI, HMI, GPS, V2X, VPS, calibration interface, engine controller), and/or other useful systems, can be used to exchange information between the vehicle systems 100 participating in the platoon. In one non-limiting embodiment, the systems mentioned above and/or other useful systems can be used to record fuel usage of the vehicle system 100 during operation. In some forms, the fuel usage recorded can be archived for later data analysis. Recordation of fuel usage and/or other measures of vehicle system 100 operation can be indexed to a specified course, whether the vehicle system 100 was participating in a platoon, what position of the platoon, atmospheric conditions at the time of recordation, etc. Such information can be useful in developing a scheme to compensate participants in a platoon (whether that be via financial compensation, compensation by preferred location in a platoon, etc) and/or can be used to penalize vehicles, particular drivers, or organizations (e.g. a vehicle fleet) that attempt to extract benefits without sharing costs. Other schemes that can benefit from the exchange of information made available via the various aforementioned systems can include platoon formation management (e.g. when to split the platoon for merging traffic purposes, etc).

Turning now to one aspect of the platooning operation of vehicle systems 100, using knowledge of locations, velocities, destinations and available hours of each of the vehicle systems 100 in a platoon (or alternatively candidates for a platoon), could permit in one embodiment the ability to direct a specific vehicle system 100 to platoon behind another and then, once in formation, use information of the first (such as, but not limited to speed and throttle characteristics) to ensure appropriate following of the second. Other information could also be used such as but not limited to inter-vehicle distance. When in a platooning arrangement, additional fuel burned by the first vehicle system, and any less by the second, can be determined (e.g. by using systems described herein), since access to relevant information is available (e.g. relevant information of the individual power trains). A baseline of fuel burn information could be determined from data from prior vehicle systems traveling that same route, coupled with atmospheric conditions and vehicle weight. Utilizing that information, the second truck in the platoon could be charged a fraction of their particular fuel savings while participating in the platoon as payment for services and compensate the lead truck for any additional expenses. The platooning history of these trucks could also be tracked in order to ensure equal instances in front or back. It will be appreciated that the information discussed above can be shared and acted upon by a controller, such as controller 104.

The platooning algorithm (which will be understood to be capable of execution on a controller, e.g. controller 104) could additionally and/or alternatively implement a model similar to a peer-to-peer sharing model. In this model, the platooning algorithm could keep track of the amount of benefit a truck has received and/or what has given up. Based on this information, trucks could be re-arranged within a platoon or this information could be used to determine the placement of the trucks in the next platoon they join. In addition, for trucks that consistently receive benefits of being a following truck without ever being the lead truck (referred to as "leeching" in computer terminology), the offending truck may have actions taken such being flagged on a fleet management report or platooning capabilities disabled for a set time or other actions.

Additionally and/or alternatively, that platooning service can be structured such that an entity that uses the platooning service without providing back to the group could eventually lose privileges and potentially be disallowed from the group. There are a few avenues with which a fleet or owner/operator could maintain equitable status and avoid this situation. One involves being a platoon leader on occasion, or having a sister truck within the fleet be the platoon leader. In this way a fleet could be treated as a whole in lieu of an individual truck, and the equitable treatment assessed across the entire fleet. Another approach to equitable participation would be to offer to be the break point in the platoon should an exit come up and the platoon needs to split for traffic maintenance (described more fully below). Another approach would be to pay a fee. Each of these approaches will be understood as being capable of implementation on a controller, such as controller 104.

The honest status of each truck/fleet can be maintained in a few ways. One is for a third party platooning service or hub to monitor subscribed accounts that keep track of the involvement and value add of each truck and/or fleet and make credits/deductions from an account based on predetermined group policy. A second method, that follows more closely to P2P networking, is for each truck to broadcast its own status, policy and history, and a shared group policy is then adhered to. Each of these approaches will be understood as being capable of implementation on a controller, such as controller 104.

Designations about which position the respective vehicle systems 100 will have within a platoon can be negotiated from vehicle to vehicle, or in some forms can be determined remotely and communicated to the vehicles. For example, a central server could receive and coordinate platoon requests/invitations and then issue commands (such as through the ITS) regarding which position the various vehicles should take. Furthermore, the compensation and/or costs/penalties described above can also be coordinated through the central clearinghouse described above (e.g. a central server) and communicated through the ITS.

In another additional and/or alternative embodiment, the size/length/arrangement of platooning vehicles can be actively managed (collectively or through a central server issuing instructions) depending on circumstances as they occur during travel of the platoon. It will be understood that such active management can be implemented in a controller, such as controller 104. The platoons can be split up or broken into one or more smaller units. Such a breakup might still result in the trucks operating as a loose platoon (e.g. with rather larger inter-vehicle distances separating each truck) until such time that the platoon can be reformed. Other breakups may result in a designation of operation in which one or more trucks is not included in the platoon and can float to whatever distance is best suited for the truck, until such time that the platoon can be re-engaged. The number of trucks in the platoon might be limited based on the influence of combination of factors. In the US, each state legislates the combination type of rearward amplification of vehicles (tractor-trailer, doubles, triples, straight truck with trailer, 5 axles, 3 axles, Rocky Mountain double, conventional double, Triple, California truck full trailer, turnpike double, etc). A platoon has a minimum length of 2. The maximum length may depend on one or more of the following: type of trailers in the platoon, state regulations (which may be detectable via GPS and database/table), operating environment (urban/rural, type of road—#lanes), determination if there is a fuel consumption benefit to the truck, road conditions (construction, weather), type of cargo (hazmat, flammables) and, if used on secondary roads (railroad crossings, traffic signals), among potential others.

The following set forth just a few examples of circumstances which might require active management of the platoon configuration:

1. The one or more vehicles in the platoon can have the ability to sense interstate exit or entrance ramps via GPS or sensing equipment where such knowledge allows the platoon to separate a distance before the ramps to create gap in the semis allowing traffic to flow between the line of trucks. The distance and gap may be calibratable and may have dependencies on vehicle speed, road conditions, and traffic density. After the passing of the entrance ramp, the lead truck slows allowing the platoon to reform back to the original status while sensing intermediate traffic and allow traffic to move out from between the platoon;
2. Detection of a municipality prohibiting platooning, which may include length restrictions and/or restrictions during certain hours/days. Such restrictions may require temporary change in platoon configuration until the municipality has been passed;
3. Emergency personnel and/or vehicles having the capability to communicate to the platoon that it needs to cut in and/or that vehicles from other lane(s) need to cut in so that the emergency vehicle can pass by;
4. Detection of the vehicle in the other lane(s) is drifting lanes (or a turn signal from the vehicle in the other lane), the platoon can temporarily separate until the vehicle passes the former platoon;
5. Passenger or other vehicles have the ability to communicate to the platoon that they want to turn and the platoon separates. The trucks could also sense the turn signals on the other vehicles and then initiate a separation of the platoon (and possible re-engagement of the remaining trucks);
6. Detection that a truck cannot keep up with the platoon (engine malfunction, not having the power in the mountains, no tire chains, need to pull off for fuel/DEF, length of driver shift) and having it break out. Truck could broadcast this information to the others in the platoon or the other trucks in the platoon could sense;
7. Determining that one or more trucks of the platoon will need to be re-routed—bridge height restrictions, bridge load restrictions, cargo type (in some instances the first truck in the platoon may communicate road information sign such as these to the other trucks);
8. Advance notification to the platoon management on truck(s) taking different routes (e.g. a truck to be diverted to another route will signal to the other trucks of its intention to leave, or in the alternative it's platoon route will have been defined prior to joining the platoon such that the end point of its platoon travels will have been known in advance to the remaining trucks); and
9. Detection of traffic density (e.g. when detecting heavy local traffic the platoon can either terminate or split allowing wider distances between platoon members until the traffic density abates).

One or more of the aforementioned circumstances can give rise to management of platoon configuration. These circumstances can be detected by one or more of the onboard systems described herein (HMI, V2X, etc), and can also be communicated via ITS. Once the circumstance is detected by the platoon management system, active control of the platoon configuration can commence. Commands or requests can be generated to separate the platoon into larger inter-vehicle distances and possibly break the platoon until a possible later engagement.

Active management of platoon configuration can be facilitated through knowledge sensed by one or more vehicles in the platoon or communicated to/from the platoon, for example:

1. Platoon broadcasts to the environment (police, emergency equipment, other vehicle, . . . ) information such as road conditions—weather, construction, accident;
2. Others (police, emergency, . . . ) can broadcast to the platoon—road conditions, accident, weekend events impacting traffic density (e.g. a heavy traffic sporting event such as the Indy 500);
3. When a platoon is in progress, all of the trucks have their headlights/taillights are on. Alternately, have some sort of visual indicator to indicate to other vehicles on the road a platoon is in progress.

Platoon management algorithms hosted in any of the devices described above (e.g. HMI, V2X, ECM, etc) can account for any of the circumstances described above. Thus, the platoon management algorithm can account for municipality restrictions, emergency vehicle needs, etc. The algorithm can furthermore be hosted in a device off vehicle in a central server where commands are then sent out to the vehicles in the platoon. Additionally and/or alternatively, the algorithm can reside in each vehicle and inter-vehicle communication can commence to negotiate how the trucks in the platoon will break/reconfigure/etc.

It will be appreciated in this written description that any of the above features (e.g. features related to financial cost or benefit, features related to expanding the platoon to permit passage of vehicles or accommodate other road conditions, features related to breaking of the platoon and possible reforming, etc) can be combined with any of the other features in any given embodiment, though it may not be explicitly described in that manner. Thus, in some embodiments one or more features from within one or across the various set of features discussed can be included in any given embodiment. Thus, although the features are discussed separately for ease of simplicity, no limitation is hereby intended regarding any potential combination.

In one aspect the present application includes an apparatus comprising recording platooning data of a vehicle that participates in a vehicle platoon, evaluating a history of platooning data of the vehicle as a result of its participation in a plurality of vehicle platoons, and determining an economic action to be assessed to the vehicle as a result of the history of platooning.

One feature of the present application includes wherein the evaluating includes evaluating the history of platooning against a predetermined criteria, and wherein the history of platooning data includes the placement of the vehicle in the plurality of vehicle platoons.

Another feature of the present application includes wherein the economic actions include at least one of: (1) payment for serving as a lead vehicle in a vehicle platoon; (2) a monetary charge for participating in a trailing position in a vehicle platoon; (3) re-ordering of vehicles in a current vehicle platoon; and prohibiting participation in a vehicle platoon.

Still another feature of the present application includes wherein the vehicle is a vehicle identifier associated with a vehicle fleet, wherein a plurality of vehicles participate according to the vehicle identifier.

Yet another feature of the present application further includes sharing platooning data with other vehicles, and wherein the determining is based upon a shared group policy.

Still yet another feature of the present application further includes sharing platooning data with a central clearinghouse used to monitor the history, and wherein the determining is on the basis of a predetermined group policy.

Another aspect of the present application includes an apparatus comprising a vehicle controller used to participate in a vehicle platoon, the vehicle controller structured to: regulate its position in a vehicle platoon, receive an information signal indicating the need to provide spacing in the vehicle platoon, and change a speed of the vehicle to increase distance between the vehicle and a neighboring vehicle to permit passage of a non-platooning vehicle.

A feature of the present application includes wherein the information is one of: an upcoming on ramp or off ramp; a municipality having regulation of vehicle platoons; emergency vehicles which need to cut in and/or through the vehicle platoon; detection of a drifting non-platoon vehicle; a turn signal of a non-platooning vehicle; detection of traffic density.

Another feature of the present application includes wherein the vehicle controller is further structured to formulate an information signal for broadcast to other vehicles in the vehicle platoon.

Still another feature of the present application includes wherein the vehicle controller formulates signals for regulation of vehicle indicia to indicate participation in a vehicle platoon.

Yet another feature of the present application includes wherein the vehicle controller is hosted in a vehicle.

Still yet another feature of the present application includes wherein the vehicle controller is further structured to inhibit participation in an existing vehicle platoon if such participation is not permitted according to a legal requirement.

Yet still another feature of the present application includes wherein the information signal is calibratable based upon at least one of vehicle speed, road condition, and traffic density.

Still another aspect of the present application includes an apparatus comprising: a vehicle controller used to participate in a vehicle platoon, the vehicle controller structured to: regulate its position in a vehicle platoon in a first mode of operation, evaluate an information signal indicating the need to de-platoon a vehicle platoon, and de-activate the first mode of operation based upon the information signal.

A feature of the present application includes wherein the information signal is at least one of: a municipality that regulates vehicle platoons; a vehicle indicates it cannot maintain its position in the vehicle platoon; a vehicle in the platoon must be re-routed in light of a road condition.

Another feature of the present application includes wherein the road condition is at least one of a bridge height, bridge load restriction, and cargo type.

Yet another feature of the present application includes wherein the vehicle controller is further structured to re-activate the first mode when the information signal is no longer valid.

Still another feature of the present application includes wherein the information signal is received from a broadcast.

Still yet another feature of the present application includes wherein the vehicle controller is further structured to formulate an information signal for broadcast to other vehicles in the vehicle platoon.

Yet still another feature of the present application includes wherein the vehicle controller is further structured to broadcast a request to join an existing vehicle platoon.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
    a fleet of vehicles including at least two vehicles capable of being organized for participation in vehicle platoons, wherein the at least two vehicles of the fleet are in communication with a control system configured to:
    receive information regarding one or more fleet-specified factors associated with the fleet of vehicles;
    receive platooning data for one of the two vehicles while participating in one or more vehicle platoons;
    evaluate the platooning data of the one of the two vehicles to determine platooning benefits received by the one of the two vehicles while participating in the one or more vehicle platoons and the fleet-specified factors;
    assess an action to the other of the at least two vehicles of the fleet of vehicles to arrange placement of the other of the at least two vehicles in a next vehicle platoon as a result of the evaluation of the platooning data for the one of the two vehicles and the fleet-specified factors; and
    operate the other of the at least two vehicles of the fleet in the next platoon in response to the action that is assessed.

2. The system of claim 1, wherein the fleet-specified factors include emissions banking information for the fleet of vehicles.

3. The system of claim 1, wherein the fleet-specified factors include emissions credit information for the fleet of vehicles.

4. The system of claim 1, wherein the fleet-specified factors are input into the control system from a source external to the at least two vehicles.

5. The system of claim 4, wherein the source external to the at least one vehicle includes at least one of one or more other vehicles, a utility grid, a traffic signal, and a stationary transceiver.

6. The system of claim 1, wherein the platooning data includes a history of placement of the one of the at least two vehicles in a plurality of vehicle platoons.

7. The system of claim 1, wherein the action that is assessed to the other of the at least two is to position the other of the at least two vehicles as a lead vehicle for a split portion of the next vehicle platoon.

8. The system of claim 1, wherein each of the at least two vehicles includes a vehicle identifier associated with the fleet of vehicles.

9. The system of claim 1, wherein the control system is configured to share the platooning data with other vehicles, and determine the action to be assessed based upon a shared group policy.

10. The system of claim 1, wherein the control system is configured to share the platooning data with a central clearinghouse that monitors the fleet of vehicles to determine the action on the basis of a predetermined group policy.

11. A system comprising:
a fleet of vehicles capable of being organized for participation in a vehicle platoon, wherein a plurality of vehicles of the fleet are in communication with a control system configured to:
evaluate an information signal regarding one or more fleet-specified factors associated with emissions of the fleet of vehicles;
evaluate platooning information for at least one of the plurality of vehicles while participating in vehicle platoons to determine platooning benefits received by the at least one of the plurality of vehicles while participating in the vehicle platoons;
determine a position for placement another of the plurality of vehicles from the fleet of vehicles in a next vehicle platoon in response to the information signal regarding the one or more fleet-specified factors and the platooning information related to participation of the at least one of the plurality of vehicles in vehicle platoons; and
regulate the another of the plurality of vehicles from the fleet of vehicles to operate at the determined position in the next vehicle platoon.

12. The system of claim 11, wherein the determined position is a lead vehicle for the next vehicle platoon.

13. The system of claim 11, wherein the determined position is a lead vehicle for a split portion of the next vehicle platoon.

14. The system of claim 11, wherein the fleet-specified factors include emissions banking information and emissions credit information for the fleet of vehicles.

15. The system of claim 11, wherein the fleet-specified factors are input into the control system from a source external to the one or more vehicles.

16. The system of claim 15, wherein the source external to the vehicle includes at least one of one or more other vehicles, a utility grid, a traffic signal, and a stationary transceiver.

17. The system of claim 11, wherein the control system is configured to share platooning data from the vehicle platoons with other vehicles.

18. The system of claim 11, wherein the control system is configured to share platooning data with a central clearinghouse that monitors the fleet of vehicles.

* * * * *